R. G. HANDY.
LOCK FOR MOTOR VEHICLE LEVERS.
APPLICATION FILED MAY 22, 1909.
993,364.
Patented May 30, 1911.
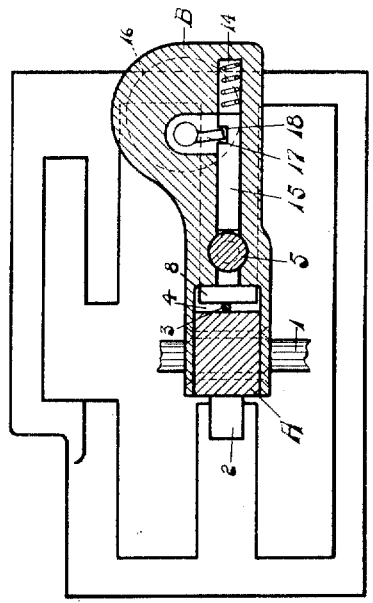
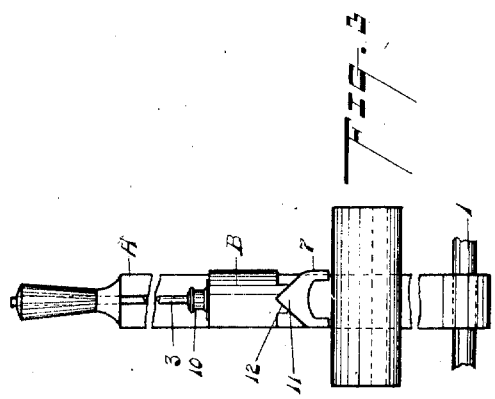
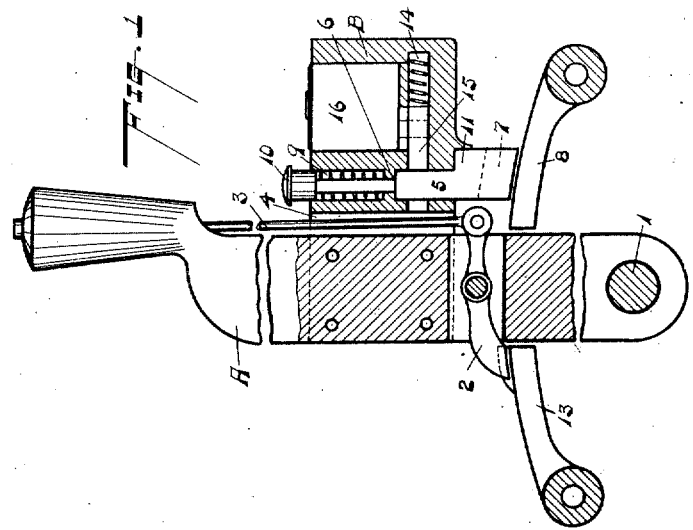
WITNESSES:
Roy Wallis
Rheph S. Warfield.
INVENTOR
Robert G. Handy
BY
Geo. B. Willcox
ATTORNEY

UNITED STATES PATENT OFFICE.

ROBERT GOUDY HANDY, OF BAY CITY, MICHIGAN.

LOCK FOR MOTOR-VEHICLE LEVERS.

993,364.

Specification of Letters Patent. Patented May 30, 1911.

Application filed May 22, 1909. Serial No. 497,749.

*To all whom it may concern:*

Be it known that I, ROBERT G. HANDY, a citizen of the United States, residing at Bay City, in the county of Bay and State of Michigan, have invented certain new and useful Improvements in Locks for Motor-Vehicle Levers; and I do hereby declare the following to be a full, clear, and exact description of the invention, such as will enable others skilled in the art to which it appertains to make and use the same.

My invention relates to means for locking the levers of motor vehicles in inoperative position, the object being to prevent the unauthorized removal of the vehicle.

A valuable automobile will frequently be left in front of a building while the owner is transacting business. Often some malicious person seeing the automobile, will appropriate it to his own use, finally leaving it in some obscure place, if not injuring it.

My invention is designed to prevent such unauthorized use of a car, by providing means whereby the operating levers may be easily and quickly locked in predetermined position, which will render it impossible for a person maliciously inclined, to start the car.

Another object of my invention is the provision of a simple, strong, durable and foolproof lock which can be applied to any valuable automobile now in use, with a minimum of expense, and which can be easily and quickly set and as easily released by a person possessing the key.

To these ends, my invention consists in certain novel features and combinations such as will be more fully described hereinafter and particularly pointed out in the claims.

In the accompanying drawings, Figure 1 is a side view, partly in section, showing the application of one embodiment of my invention to the operating lever of the change speed gear, Fig. 2 is a top plan view showing the lock and lever in cross-section, and Fig. 3 is an edge view.

The object of my invention is to provide a novel lever-carried means whereby the lever cannot be moved from its set or predetermined position, and it is obvious that I might apply a lock to any of the operating levers as the emergency brake lever for instance, but in the present application, I have shown one form of my invention applied to the change speed lever and adapted to releasably engage the selective quadrant to retain the lever in neutral position, wherein the gears are out of mesh.

Referring to the drawings, A indicates a change speed lever of the usual type secured to the usual shaft 1. The lever is provided with a dog 2 pivoted to the lever and actuated by means of a depressible rod 3, the free end of which passes through the handle. As this is a common form of construction and has no bearing on my invention, a further description is not necessary, it being understood that my invention can be applied to any form of lever on the market, so far as I am aware. The selective quadrant, having an H-slot, is also old and well known in the art, it being understood that when the lever is in the position shown in Fig. 2, the gears are out of mesh and no motion is transmitted to the drive shaft or axle. The dog 2 coöperates with the quadrant in the usual manner, it being understood that my invention can be employed with any quadrant other than that shown.

One form of my invention, as shown, comprises a casing B secured to the lever. As one means for securing such casing to the lever, I may slot the casing as shown at 4, to receive the lever, fastening means being passed through the walls of the slot and the lever. The casing preferably overhangs the quadrant, and a bolt 5 having a shoulder 6 thereon is slidingly mounted in the casing. That end of the bolt adjacent the quadrant is forked as at 7 and adapted to straddle the arm 8 of the quadrant. The bolt is held normally out of engagement with the quadrant, by means of a spring 9 mounted on the casing and engaging the head 10 of the bolt. The stem of the bolt may be squared to prevent the rotation of the bolt in its seat, but I have shown such bolt as equipped with an inclined guide 11 receivable in a recess 12 on the under face of the casing whereby to insure that the bolt cannot rotate to bring its forked end transverse to the arm 8 of the quadrant.

In order to operate the bolt, all that is necessary is to depress the head 10 against the action of the spring 9 when the lever A is in neutral position, whereby the forked end 7 of the bolt takes over the arm 8 of the quadrant, to prevent lateral movement of the lever, forward and backward movement thereof being prevented by the opposite arm 13 of the quadrant.

As one means for retaining the bolt in locked position, I provide the casing B with a passage 14 extending transversely to the bolt and adapted to receive a spring-pressed pin 15, the end of which normally engages the stem of the bolt below the shoulder 6 thereof. When the bolt is depressed, the shoulder passes below the end of the pin, which, pressed by its spring, takes over the shoulder to hold the bolt depressed and the lever in locked position. The pin is concealed in the casing and is beyond the reach of ordinary inquisitiveness. The pin may be conveniently retracted in any suitable manner, one such means comprising a key-receiving cylinder 16 (commonly known as a cylinder lock, the construction of which forms no part of my invention). Such lock controls the position of a rotatable cam 17, the free end of which is received in a notch 18 in the pin 15. The insertion of the proper key in this lock (which is seated in the casing B), will partially rotate the cam 17 to retract the pin against the action of its spring. As soon as the end of the pin clears the shoulder 6 of the bolt, spring 9 will operate to raise the bolt 5 and release the lever A.

It is conceivable that other means than a shoulder 6 might be employed to coöperate with the locking pin 15 and that other changes might be made without departing from the spirit and scope of my invention.

The device is very simple and inexpensive, is self-contained and may be directly applied with a minimum of time and labor, to any change speed lever and quadrant of which I am aware. It prevents the theft of automobiles and provides a simple and effective guard against injury to the car, arising from the tampering therewith by unauthorized persons. The lock being carried by the lever, is never in the way and is always in readiness for operation.

Having thus fully disclosed my invention, what I claim as new, is:—

1. The combination with a stationary member and a lever movable relative thereto, of a forked member carried by the lever and adapted to engage the stationary member to prevent movement of the lever, yielding means normally retaining the forked member out of engagement with the stationary member, a lock adapted to maintain the forked member in engagement with the stationary member, and means for releasing the lock.

2. The combination with a stationary quadrant and a lever movable relatively thereto, of a casing secured to the lever and overhanging the quadrant, a bolt carried by the casing, a shoulder on said bolt, a spring concealed in said casing and adapted to hold the bolt normally out of engagement with the quadrant, a spring-pressed pin carried by said casing and adapted to take over the shoulder of said bolt when the bolt is depressed, said pin formed with a notch, a rotatable cam adapted to engage said notch, and means for actuating said cam.

3. The combination with a stationary quadrant and a lever movable relative thereto, of a casing secured to the lever and overhanging the quadrant, a bolt formed with a shoulder and having its lower end forked to engage the quadrant, a spring adapted to hold the bolt normally out of engagement with the quadrant, a spring-pressed pin carried by said casing and adapted to engage the shoulder of said bolt when the bolt is depressed, said pin formed with a notch, a rotatable cam adapted to engage said notch, and means adapted to actuate said cam.

In testimony whereof, I affix my signature in presence of two witnesses.

ROBERT GOUDY HANDY.

Witnesses:
ANNA J. TUTHILL,
CLARENCE D. TARBELL.